Figures 1, 2:
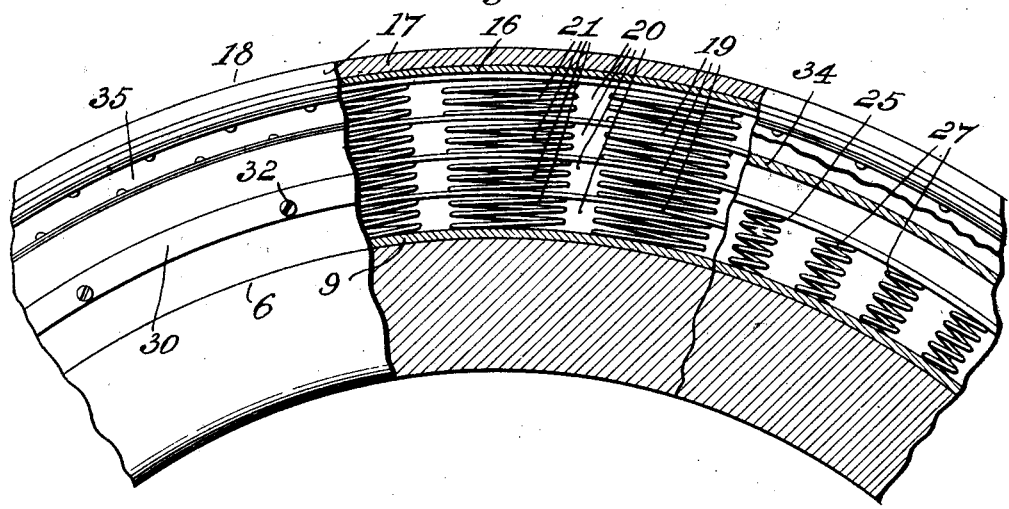

T. J. FURPHY, Jr.
WHEEL FOR VEHICLES.
APPLICATION FILED SEPT. 23, 1907.

905,866.

Patented Dec. 8, 1908.

2 SHEETS—SHEET 1.

WITNESSES:
Wilhelm Vogt
Thomas M. Smith

INVENTOR
Thomas J. Furphy Jr.
BY
J. Walter Douglas
ATTORNEY.

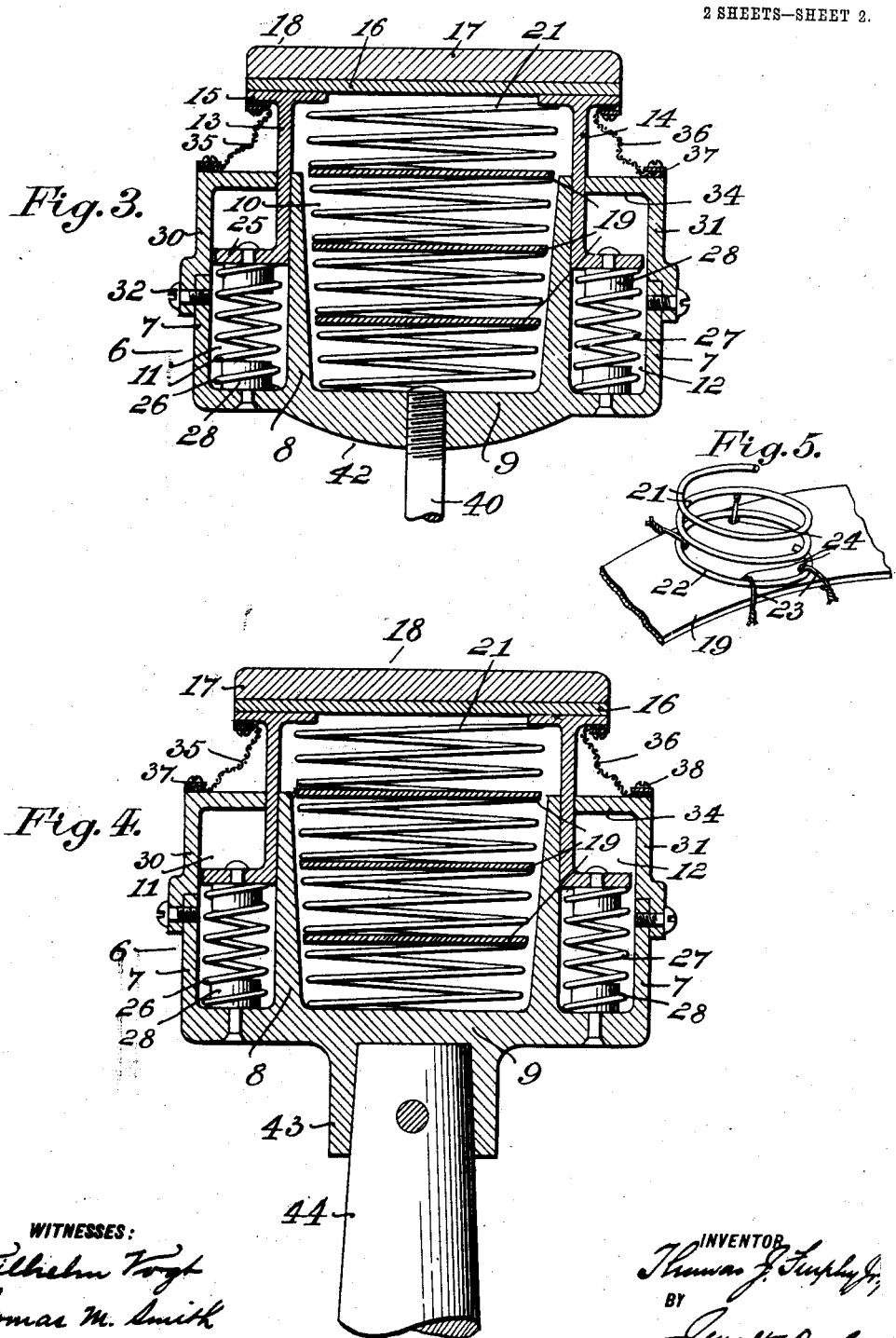

UNITED STATES PATENT OFFICE.

THOMAS J. FURPHY, JR., OF PHILADELPHIA, PENNSYLVANIA.

WHEEL FOR VEHICLES.

No. 905,866.  Specification of Letters Patent.  Patented Dec. 8, 1908.

Application filed September 23, 1907. Serial No. 394,046.

*To all whom it may concern:*

Be it known that I, THOMAS J. FURPHY, Jr., a citizen of the United States, residing at Germantown, in the city and county of Philadelphia and State of Pennsylvania, have invented certain new and useful Improvements in Wheels for Vehicles, of which the following is a specification.

My invention has relation to a spring controlled cushioning wheel for motor and other vehicles; and in such connection it relates particularly to the constructive arrangement thereof for defined purposes, among others, as hereinafter more fully described.

The nature and scope of my invention will be more fully understood from the following description taken in connection with the accompanying drawings forming part hereof, in which Figure 1 is a view partly in elevation and partly in section of a portion of a wheel embodying main features of my invention as to one application of such features to a wheel. Fig. 2 is a cross-sectional view, enlarged, of the wheel of Fig. 1. Fig. 3 is a similar view of a modified form of the wheel, showing as to essential features of my said invention the application of the same to a motor vehicle wheel. Fig. 4 is a similar view of a still further modified form of the said features of my invention in application to an ordinary wooden spoke wheel for different types of vehicles; and Fig. 5 is a view showing, perspectively, the connection of one of the coiled springs of the series with a supporting flexible or resilient ring therefor.

Referring to the drawings 6, is the inner section of the tire of the wheel provided with respectively, inner and outer flanges 8 and 7, of differing widths in cross-section and preferably formed integral with the base 9 thereof. The so shaped inner section 6, forms a large central chamber 10, and two outer and smaller chambers 11 and 12, which latter are adapted to receive and guide two rings or flanges 13 and 14, of substantially L-shape in cross-section. The rings 13 and 14, are connected with each other at their outer flanged portions 15, by a metal tire or ring 16, supporting a cushioning solid tire 17. These rings 13 and 14, in conjunction with the solid tire 16 and yielding or cushioning tire 17, form the outer section 18 of the tire of the wheel, having free movement within the inner section 6, and closing the central chamber 10 thereof.

In the central chamber 10, are arranged a series of concentrically arranged yielding rings 19, forming between each other and in conjunction with the base 9, of the inner section 6, and the solid tire 17, of the outer section 18, annular chambers 20, each of these chambers is adapted to receive a series of radially arranged coiled springs 21. These springs are short in length but wide in width and offer appreciable resistance against compression. The resistance offered by these series of springs in their superposed relationship is far greater than could possibly be obtained through the use of a single spring of the length of the combined series of coiled springs 21, in their respective superposed relationship in the wheel. The rings 19, being yielding offer no resistance to the free movement of the springs 21 and hence assist the same in the support of the outer section 18, within the inner section 6. In order to hold the series of coiled springs 21, in proper position, the end windings 22 thereof, by means of short wires 23, passing over the windings and through openings 24, in the rings 19, securely connect them with the same, by twisting the wires 23 together at their ends as shown in Fig. 5. The series of coiled springs 21, in conjunction with the springs 26 and 27, are adapted to yieldingly support a load bearing on the outer section of the tire of the wheel by the inner section thereof. In order to prevent as far as possible, side movement of the outer section in the inner section, between the flanges 25 of the rings 13 and 14, and the base 9, of the inner section 6, and within the chambers 11 and 12 thereof, are arranged a series of coiled springs 26 and 27. These springs are held in proper operative position in the chambers 11 and 12, by studs 28, respectively connected to the base 9, of the inner section 6, and to the flanges 25 of the rings 13 and 14.

The series of springs 26 and 27, are likewise radially arranged in the chambers 11 and 12, of the inner section 6, and to render the same capable of serving the purpose of resisting side movement of the outer section 18, in the inner section 6, are made stronger than the series of coiled springs 21. To guide the outer section 18, in the inner section 6, the flanges or rings 13 and 1 of the outer section are arranged so as to preferably slide on the flanges 8, of the inner section 6. The sections 6 and 18, are movably connected with each other by means of rings 30 and 31, which are angular in cross-section and which by means of threaded bolts 32, are movably secured to the flanges 7, of the inner section 6, while the angular portions 34 thereof bear against the rings 13 and 14, of the outer section 18, and thus assist in the holding of the same in proper operative position in the inner section 6. By removing the rings 30 and 31, from the inner section 6, and by also removing one of the flanges or rings 13 or 14, of the outer section 18, the sections can be readily separated from each other, for replacing broken springs 21, 26 or 27 or rings 19, or for any other desired purpose.

In order to prevent entrance of fluid or extraneous matter into the respective sections, between the flange 34, of the connecting rings 30 and 31, and flanges 15 of the flanges or rings 13 and 14, of the outer section 18, are arranged flexible waterproof strips or bands 35 and 36. These strips or bands are preferably connected with the said parts, by means of metal rings 37, and screw-bolts 38. The tire is so constructed and having a flat straight base 9, may be readily applied to the felly of wooden wheels by slipping the same sidewise on the felly and connecting the tire therewith by bolts 40, passing through the base 9, of the inner section 6 thereof and into a boss 41, preferably formed integral with the base as shown in Fig. 2. When the tire is to be applied to a motor vehicle wheel, the base 9, of the inner section 6, is curved as at 42, in Fig. 3, to permit of the introduction of the tire into a depression formed in the felly of such a wheel. To adapt such a tire for use to the ordinary spoke vehicle wheel the base 9, of the inner section 6, is provided with sockets 43, to receive the spokes 44, as shown in Fig. 4.

It will be observed that a wheel constructed and arranged as hereinafter explained is not only very strong and inexpensive in construction and especially adapted for use for motor vehicles, but is also readily separable for repairing or the replacing of parts thereof. Moreover, the provision of a broad flat tread for the wheel reduces possibility of skidding or sliding in use on wet or damp ground.

Having thus described the nature and objects of my invention what I claim as new and desire to secure by Letters Patent is:—

1. A wheel of the character described, comprising an outer section and an inner section forming chambers, superposed short coiled springs arranged in series and mounted in the central chamber, rings interposed between said springs, long coiled springs arranged in the outer chambers of said sections, said rings and series of springs adapted to support and maintain the outer or tread section in operative position.

2. A wheel of the character described, comprising an outer section and an inner section forming chambers, superposed short coiled springs arranged in series and mounted in the central chamber, rings interposed between said springs, long coiled springs arranged in the outer chambers of said sections, said rings and series of springs adapted to support and maintain the outer or tread section in operative position, means connected with the inner section abutting against the outer section and adapted to slidably and removably connect the same with each other and flexible means connected with the outer and inner sections and adapted to prevent entrance of extraneous matter or fluid into the respective sections.

3. A wheel of the character described, comprising an inner section having flanges forming chambers, an outer section having a tread portion and rings connected therewith and provided with flanges adapted to slide in the outer of said chambers, springs arranged in the outer chambers and engaging the flanges of the rings of said outer section, a series of concentrically arranged yielding rings located in the central chamber of said inner section and forming annular chambers, a series of springs arranged in each of said annular chambers between said rings and said outer and inner sections, said rings and series of springs arranged so as to support and maintain said outer section in operative position within said inner section.

4. In a wheel of the character described, an inner section having flanges, an outer section having a tread portion and rings having flanges said rings abutting against flanges of said inner section, the flanges of said inner and outer sections forming chambers, springs arranged in said chambers and adapted to bear respectively against the tread portion and flanges of the rings of said outer section, and rings removably connected with said inner section abutting against said outer section and adapted to connect the respective sections with each other.

5. In a wheel of the character described, an inner section having flanges, an outer section having a tread portion and rings having flanges, said rings abutting against flanges of said inner section, the flanges of said inner and outer sections forming chambers, springs arranged in said chambers and adapted to bear respectively against the tread portion and flanges of the rings of said outer section, rings removably connected with said inner section abutting against said outer section and adapted to connect the respective sections with each other, and flexible strips respectively secured to said connecting rings and rings of said outer section and adapted to prevent entrance of extraneous matter or fluid into said sections.

6. In a wheel of the character described, an inner section having flanges, an outer section having a tread portion and rings having flanges, said rings abutting against flanges of said inner section, the flanges of said inner and outer sections forming chambers, springs arranged in said chambers and adapted to bear respectively against the tread portion and flanges of the rings of said outer section, rings removably connected with said inner section and abutting against said outer section and adapted to connect the respective sections with each other, flexible strips respectively secured to said connecting rings and rings of said outer section and adapted to prevent entrance of extraneous matter or fluid into said sections and means respectively connected with said outer and inner sections and with said rings and adapted to hold said springs in operative position in said sections.

In witness whereof, I hereunto set my signature in the presence of two subscribing witnesses.

THOS. J. FURPHY, Jr.

Witnesses:
J. WALTER DOUGLAS,
THOMAS M. SMITH.